(12) United States Patent  (10) Patent No.: US 6,708,743 B2
Ziehm  (45) Date of Patent: Mar. 23, 2004

(54) STUMP GRINDER APPARATUS (75) Inventor: Robert P. Ziehm, Grafton, OH (US)

(73) Assignee: Bucktooth Grinding Company LLC, Vermilion, OH (US)

( * ) Notice: Subject to any disclaimer, the term of this patent is extended or adjusted under 35 U.S.C. 154(b) by 23 days.

(21) Appl. No.: 10/139,930

(22) Filed: May 7, 2002

(65) Prior Publication Data

US 2003/0209285 A1 Nov. 13, 2003

(51) Int. Cl.⁷ .............................. A01G 23/06; B27C 1/00
(52) U.S. Cl. .................... 144/24.12; 144/235; 144/241; 144/334; 299/102
(58) Field of Search ..................... 37/189, 302; 125/39; 144/24.12, 218, 223, 228, 235, 241, 334; 241/294, 101.73; 451/540; 249/102, 103, 106, 107

(56) References Cited

U.S. PATENT DOCUMENTS

| 1,312,450 | A | | 8/1919 | McKoy et al. |
| 1,321,044 | A | | 11/1919 | Hurd |
| 4,783,914 | A | | 11/1988 | Bowling |
| 4,827,995 | A | | 5/1989 | Wilson |
| 4,974,649 | A | * | 12/1990 | Manning .................... 144/235 |
| 5,135,035 | A | | 8/1992 | Mills |
| 5,158,126 | A | | 10/1992 | Lang |
| 5,203,388 | A | | 4/1993 | Bowling |
| 5,269,355 | A | | 12/1993 | Bowen |
| 5,355,918 | A | | 10/1994 | Lang |
| 5,365,986 | A | | 11/1994 | Hooser |
| 5,381,840 | A | | 1/1995 | Bowen |
| 5,419,380 | A | | 5/1995 | Bot |
| 5,497,815 | A | | 3/1996 | Bowling |
| 5,555,652 | A | | 9/1996 | Ashby |
| 5,623,979 | A | | 4/1997 | Bowling |
| 5,743,314 | A | | 4/1998 | Puch |
| 5,829,497 | A | | 11/1998 | Maroney |
| 6,021,825 | A | | 2/2000 | Bowling |
| 6,047,749 | A | | 4/2000 | Lamb |
| 6,138,725 | A | * | 10/2000 | Leonardi et al. ............ 144/235 |
| 6,213,931 | B1 | | 4/2001 | Twardowski et al. |
| 6,484,766 | B1 | * | 11/2002 | Falatok et al. ........... 144/24.12 |

OTHER PUBLICATIONS

Webpages from www.vermeer.com, viewed on Mar. 23, 2002.
Copy of Vermeer Full–Line Catalog, 2001.
Webpages from www.raycomfg.com, viewed on Mar. 4, 2002.
Webpages from www.usstell.com, viewed Apr. 15, 2002.
Webpages from www.stumpcutters.com, viewed Mar. 25, 2002.

* cited by examiner

Primary Examiner—W. Donald Bray
(74) Attorney, Agent, or Firm—Rankin, Hill, Porter & Clark LLP (57) ABSTRACT A stump-grinding apparatus includes a block having an inner surface and an outer surface. The inner surface is adjacent to a side of the wheel between the center of wheel and the peripheral edge. The outer surface defines both a groove and a first aperture in the groove. A tooth is received into the groove. The tooth has a first end and a second end spaced from the first end. The second end defines a second aperture that can align with the first aperture. A fastener extends through the first and second aperture to fasten the tooth to the block.

22 Claims, 5 Drawing Sheets

STUMP GRINDER APPARATUS

BACKGROUND OF THE INVENTION

1. Field of the Invention

The present invention relates to a device for use in grinding a tree stump. More particularly, the invention relates to a stump grinding assembly that includes a cutting tooth and a holding block for the cutting tooth.

2. Description of Related Art

It is sometimes desirable to remove a tree stump. Rotary wheel stump grinders are typically employed for this purpose. Conventional rotary stump grinding wheels typically employ a plurality of cutting teeth that extend from the rotary wheel. During normal operation of the stump grinder, the cutting teeth are subjected to large impact and abrading forces. Consequently, the teeth and the wheel may break due to the impact and wear out due to the abrading force. When this occurs, one or more teeth must be replaced. Replacement of stump grinding teeth can be a time consuming process, in part because the radial projection of each tooth must be adjusted to a predetermined, optimum value before fastening the tooth to the wheel.

In some prior art stump grinding devices, cutting teeth are directly fastened to the rotary wheel. If the tooth is fastened to the wheel using a bolt, for example, then the bolt is solely responsible for holding the tooth to the wheel. If the impact force applied to the tooth is larger than the bolt's shear strength the bolt will fail and the tooth will shear away from the wheel. In such arrangements, the wheel can also be damaged when a large impact force is applied to one or more teeth. The impact force on the tooth is communicated directly to inner surfaces of the wheel that define the bolt hole(s) that receive the bolt(s). The impact force may cause the aperture through which the bolt passes to misshape or enlarge. Consequently, the fit of a replacement bolt may become loose and subject the tooth and wheel to additional damage.

Mounting the tooth to a block on the periphery of the wheel does not provide a suitably thick section on which to fasten the tooth. Because there is no thick wheel portion to support the block, and further to support the tooth, there is an increased likelihood that the tooth and block may be sheared from the wheel.

With reference to teeth that fasten directly to the wheel, a proper seat of the tooth against the wheel is desirable. Teeth that are formed from cast metal sometimes have protuberances and bumps that, although small, preclude a flat surface-to-surface contact between the tooth and the wheel. That is, the bumps act as legs between a surface on the tooth and the surface of the wheel. This can allow play between the tooth and the wheel and can exacerbate the effect that the impact force has on the tooth. Also, moisture can wick under the tooth to create rust and corrosion. Rust and corrosion of the teeth has been a reoccurring problem in the use of these types of teeth and wheel assemblies.

SUMMARY OF THE INVENTION

The present invention provides a stump-grinding apparatus for use with a stump-grinding wheel. The apparatus includes a block having an inner surface and an outer surface. The inner surface is adjacent to a side of the wheel between the center of wheel and the peripheral edge. The outer surface defines both a groove and a first aperture in the groove. A tooth is received into the groove. The tooth has a first end and a second end spaced from the first end. The second end defines a second aperture that can align with the first aperture. A fastener extends through the first and second aperture to fasten the tooth to the block.

The present invention also provides a stump-grinding apparatus. The stump-grinding apparatus includes a stump-grinding wheel that is centered on an axis and has a peripheral edge. The stump-grinding apparatus also includes a first cutting assembly that secures to the wheel. The first cutting assembly includes a first tooth that extends beyond the peripheral edge of the wheel. A second cutting assembly, which is also secured to the wheel, includes a second tooth that extends from the side of the wheel at an angle in the range of about 35 to about 55 degrees relative to a plane defined by the side of the wheel.

DETAILED DESCRIPTION OF PREFERRED EMBODIMENTS

Figure 1:
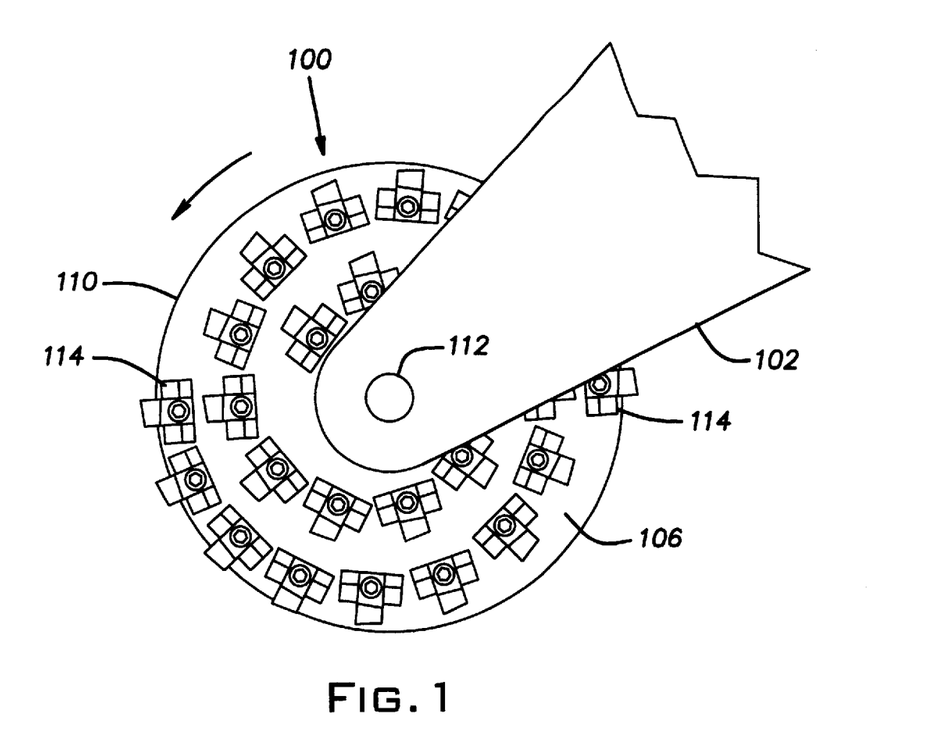
FIG. 1 is a schematic side view of an apparatus comprising a first embodiment of the invention.

A stump-grinding apparatus 100 in accordance with a first embodiment of the invention is shown in FIG. 1. The apparatus 100 is mounted to a stump grinder 102 that rotates the apparatus 100. The apparatus 100 comprises a stump-grinding wheel 106 that, when rotated, can be used to grind and cut a tree stump.

With reference to FIG. 1, the wheel 106 is a steel disk having a peripheral edge 110 and a center hub 112. In this embodiment, the wheel 106 is a 122 centimeter (cm) (48 inch) diameter, 3.8 cm (1.5 inch) thick cutter wheel that can fit, for example, a Hurricane stump grinder, commercially available from JP Carlton Company, Inc. (Spartanburg, S.C.).

Figure 2:
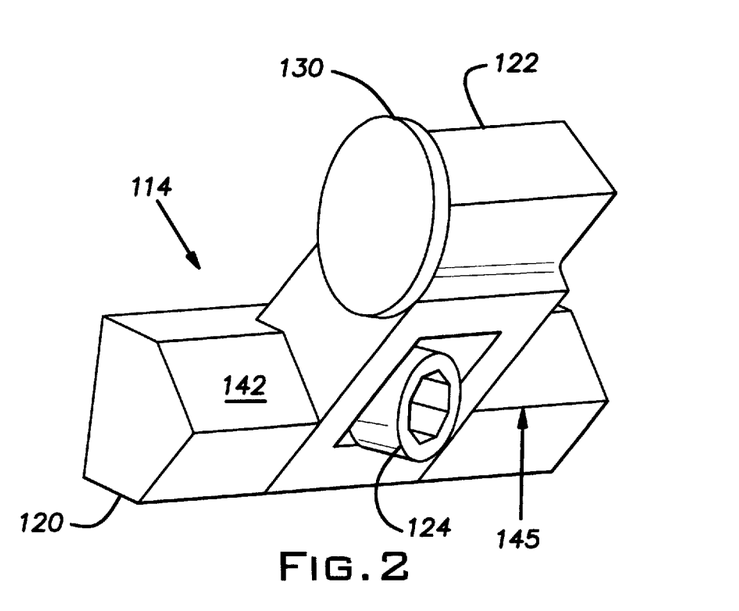
FIG. 2 is an elevated perspective view of part of the apparatus shown in FIG. 1.

The apparatus 100 also includes a cutting assembly 114. As shown in FIG. 2, the cutting assembly 114 includes both a block structure 120 and a tooth structure 122. A bolt 124 fastens the tooth 122 into the block 120. A cutting bit 130 is at an opposite end of the tooth 122 from the bolt 124.

Figure 3:
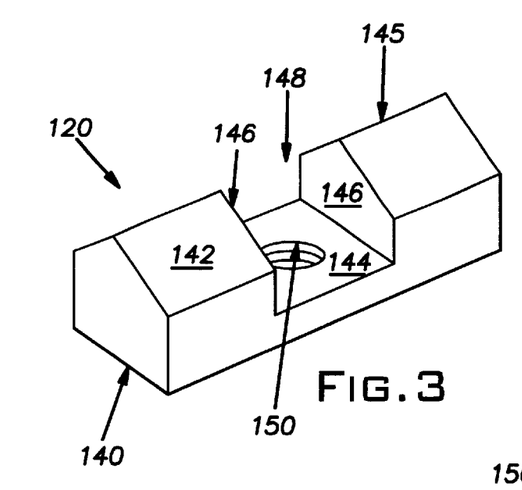
FIG. 3 is an elevated perspective view of part of the apparatus shown in FIG. 2.

With reference to FIGS. 2 and 3, the block 120 is preferably machined from calcium treated 4140 steel and has an inner side 140 (see FIG. 4) and an outer side 142, opposite the inner side 140. A portion of the outer side 142 has a bottom surface 144 and two side surfaces 146 that together define a groove 148. The bottom surface 144 further defines a threaded aperture 150 in the block 120. The outer side 142 is also preferably cut at two 45 degree angles with reference to the inner side 140. The two angles form a longitudinal ridge 145 along the outer side 142.

In this embodiment, the block 120 weighs about 1.6 Kilograms (Kg) (3.5 pounds). The block 120 is about 15.2 cm (6 inches) long, about 5 cm (2 inches) tall, and about 5 cm (2 inches) wide.

Figure 4:
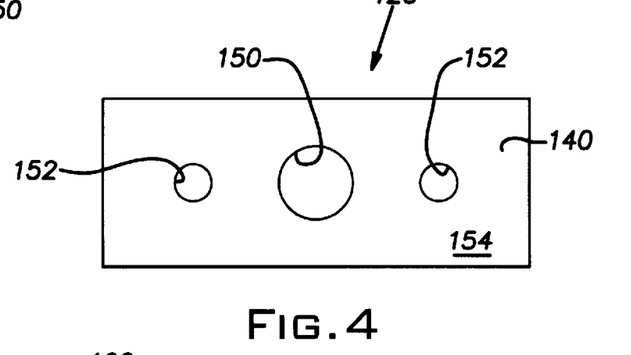
FIG. 4 is a bottom view of part of the apparatus shown in FIG. 3.

With reference to FIG. 4, the inner side 140 of the block 120 is shown. The inner side 140 preferably includes two alignment cavities 152. The cavities 152 are spaced apart from each other and centered adjacent to the aperture 150. The alignment cavities 152 are sized and shaped to mate with locating pins (not shown) affixed to the wheel 106, and thus orient the block 120 on the wheel 106. The inner side 140 is welded to a side of the wheel 106 between the center hub 112 and the peripheral edge 110.

Figure 5:
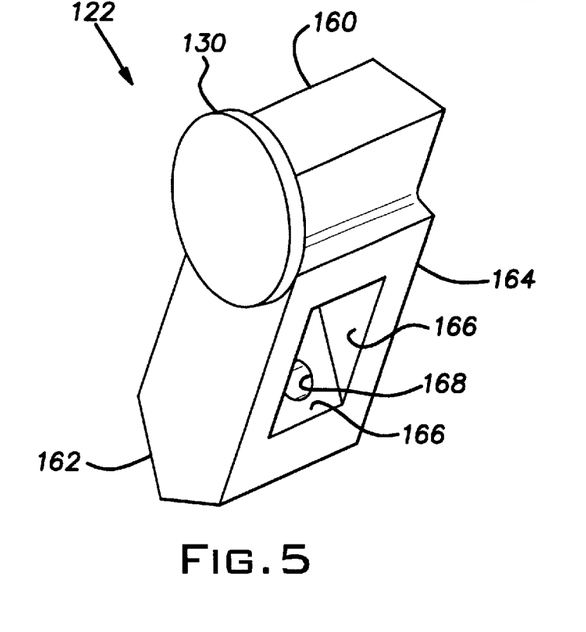
FIG. 5 is an elevated perspective view of a portion of the apparatus shown in FIG. 2.

With reference to FIG. 5, the tooth 122 is also preferably machined from 4140 steel, and has a distal portion 160, and a base portion 162 spaced from the distal portion 160. A body portion 164 extends from the base portion 162 toward the distal portion 160. The cutting bit 130 is preferably a round, carbide-steel disk that is brazed to the cutting portion 160.

The body portion 164 has a plurality of surfaces 166 that define a recessed area in the body portion 164. One of the surfaces 166 further defines a smooth-bore aperture 168 that extends from the recessed area through the base portion 162 of the tooth 122.

The base portion 162 fits securely into the groove 148. The aperture 168 aligns with the aperture 150 in the block 120. When the apertures 150, 168 are aligned, the tooth 122 extends from the block 120, preferably at an angle of 45 degrees from a plane defined by a surface of the wheel 106. Alternatively, other suitable teeth can extend from the block at an angle in a range of from about 0 to about 55 degrees.

In this embodiment, the tooth 122 weighs about 1.1 Kilograms (Kg) (2.5 pounds). The tooth 122 is 8.5 cm (3.8 inches) long, about 5 cm (2 inches) wide, and about 3.8 cm (1.5 inches) deep. The bolt 124 weighs about 318 grams (0.7 pounds) and is about 13 cm (5.3 inches) long and has a diameter of about 1.9 cm (0.75 inches).

During assembly, the locating pins align the block 120 on the wheel 106. Once aligned, the block 120 is welded to the wheel 106. The tooth 122 orients in the groove 148 to align the apertures 150, 168 with each other. The bolt 124 fastens the tooth 122 to the block 120. Specifically, the bolt 124 extends through the aperture 168 and threads into the aperture 150.

During operation, the wheel 106 rotates in the direction indicated by the directional arrow labeled SPIN in FIG. 1. The rotating apparatus 100 is contacted against, for example, a tree stump. Because the cutting bit 130 extends from the wheel 106, it is generally the first part of the apparatus 100 that contacts the stump. The round shape of the bit 130 facilitates cutting soft wood and any adjacent sandy soil. The tooth 122 can impact against the stump and also the ground during use. This impact places a shear load on the cutting assembly 114.

Without the support provided by the holding block 120, the shear strength of the tooth 122 would be dependent solely on the shear strength of the bolt 124. In that circumstance, if the shear load exceeds the shear strength of the bolt 124, the tooth 122 would shear from the wheel 106. However, because the tooth 122 is received into the groove 148, and is thus supported by the holding block 120, the surfaces 146 provide additional support to the tooth 122. This additional support increases the shear load necessary to shear the tooth 122 from the wheel 106.

Further, should the shear load still exceed the shear strength of the tooth 122, the tooth 122 shears preferentially from the block 120, rather than the block 120 from the wheel 106. This is due to such factors as the strength of the weld and choice and size of the bolt 124.

If the tooth 122 is sheared from the block 120, a replacement tooth can be efficiently installed to replace the original, sheared-off tooth. The replacement tooth automatically aligns in the groove 148, so that the replacement tooth can be efficiently installed. Further, only the single bolt 124 is necessary to fasten a replacement tooth, rather than, for example, two bolts.

Should the entire cutting assembly 114 be sheared from the wheel 106, a replacement cutting assembly can be efficiently installed to replace the original, sheared-off cutting assembly 114. The replacement cutting assembly is efficiently installed because the locating pins are able to align with the locating cavities 152 and thereby to efficiently align the holding block 120.

Figure 6:
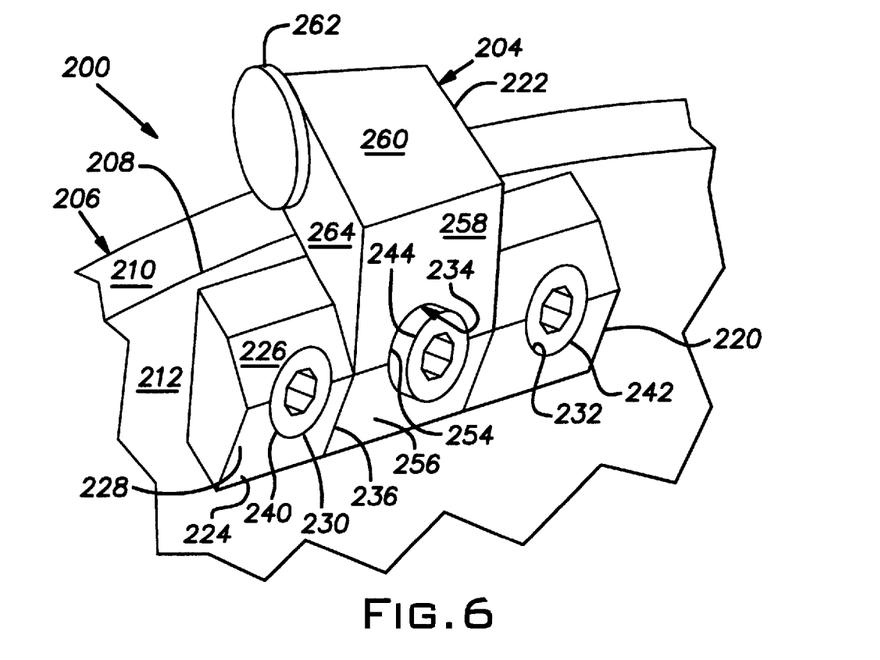
FIG. 6 is a perspective view of a portion of an apparatus comprising a second embodiment of the invention.

An apparatus 200 comprising a second embodiment of the invention is shown in FIG. 6. The apparatus 200 includes a wheel 206, which has a peripheral edge 208 separating a peripheral edge surface 210 from a flat surface 212. A cutting assembly 204 mounts on the flat surface 212 of the wheel 206 proximate to the edge 208.

The cutting assembly 204 includes a holding block 220 and a cutting toothed 222 comprised of carbon steel. The holding block 220 has an outer surface 224 that defines first and second planes 226, 228. The first plane 226 forms about a 35 degree angle and the second plane 228 forms about a 55 degree angle from a plane parallel to a plane defined by the flat surface 212. It will be appreciated that the angles formed between the first plane 226 and the plane parallel to a plane defined by the flat surface 212 and the second plane 228 and the plane parallel to a plane defined by the flat surface 212 are not critical, and that any combination of angles, the sum of which is 90 degrees, could be used.

The block 220 defines first and second smooth bore apertures 230, 232. The apertures 230, 232 that are spaced equally distant from a third smooth bore, middle aperture, which is not shown, but which is centered in a groove 236 in the block 220. The apertures 230, 232 have a larger diameter than the third, middle aperture. The apertures 230, 232 align with corresponding apertures (not shown) in the wheel 206.

Allen head bolts 240, 242, 244 respectively extend through the apertures 230, 232 and the third, middle aperture through the block 220, and further extend through the corresponding apertures in the wheel 206. The bolts 240, 242, 244 fasten to nuts (not shown) on the opposite side of the wheel 206 from the block 220 to fasten the block 220 to the wheel 206. Alternatively, the bolts 240, 242, 244 are threadedly received in a second block (not shown), which may or may not be provided with a cutting tooth.

The tooth 222 defines an aperture 254 that aligns with both the aperture in the block 220 and the corresponding aperture through the wheel 206. The bolt 244 fastens the cutting tooth 222 into place in the groove 236. As described above, the bolt 244 extends through both the aperture 254 and the aperture in the block 220, and further through the corresponding aperture through the wheel 206.

The tooth 222 can be described in terms of three portions. Specifically, the tooth 222 extends from a base portion 256 along a middle portion 258 to a distal portion 260. A cutting bit 262 is preferably soldered, or alternatively threadedly connected to, a lead side 264 at the distal portion 260 of the tooth 222. The middle portion 258 extends from the base portion 256 beyond and around the peripheral edge 208 of the wheel 206. The distal portion 260 is spaced radially from the edge surface 210 with reference to the wheel 206. Thus, the cutting bit 262 overhangs the edge surface 210.

During operation, the wheel 206 rotates and the apparatus 200 makes contact with, for example, a tree stump. Because the cutting bit 262 extends from the wheel 206, it is generally the first part of the apparatus 200 that contacts the stump during each succeeding rotation of the wheel 206. As the cutting bit 262 impacts against the stump, the tooth 222 is subjected to a shearing force. If the shearing force exceeds the shear strength of the tooth 222, the tooth 222 will preferentially shear from the block 220. As described above with reference to the holding block 120 (in the first embodiment), the block 220 supports the tooth 222 to increase the amount of shear load that would be necessary to shear the tooth 222 from the block 220.

Should the shear load still exceed the shear strength of the tooth 222 and the tooth 222 is thus sheared from the block 220, a replacement tooth can be installed to replace the original, sheared-off tooth 222 because the tooth 222 shears preferentially over the block 220, thus leaving the block 220 available to align a replacement tooth. The tooth 222 shears preferentially because the single, smaller bolt 244 has a lowered shear strength in comparison to the two larger bolts 240, 242.

Also, should the entire assembly 204 be sheared from the wheel 206, a replacement assembly can be installed to replace the original, sheared-off assembly. The apertures 230, 232 align with the corresponding apertures in the wheel 206 to facilitate efficient installation of a replacement assembly.

Figure 7:
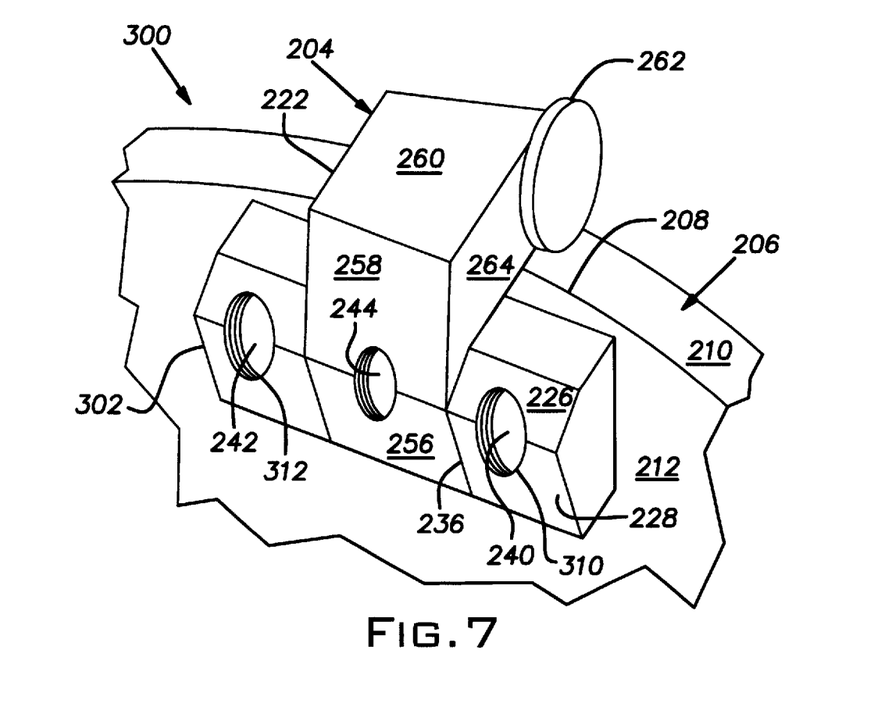
FIG. 7 is a perspective view of a portion of an apparatus comprising a third embodiment of the invention.

An apparatus 300 comprising a third embodiment of the invention is shown in FIG. 7. The apparatus 300 includes many parts that are substantially the same as corresponding parts shown in the second embodiment, and thus such parts have the same reference numerals as corresponding parts in FIG. 6. The apparatus 300 differs in that it includes a holding block 302 defining threaded apertures 310, 312, 314 (not shown).

Allen head bolts 340, 342, 344 extend from the opposite side through the apertures in the wheel 206 to thread into the threaded apertures 310, 312, 314 (not shown). This arrangement can maintain the exposed bolt heads of the bolts 340, 342, 344 on the opposite side of the wheel 206 below the point of impact with a tree stump. By spacing the bolt heads from the impact, the bolt heads are exposed to a decreased risk of damage from the impact.

In a preferred embodiment, the apparatuses 200, 300 cooperate with each other and the bolts 340, 342 to fasten to the sides of the wheel 206.

Figure 8:
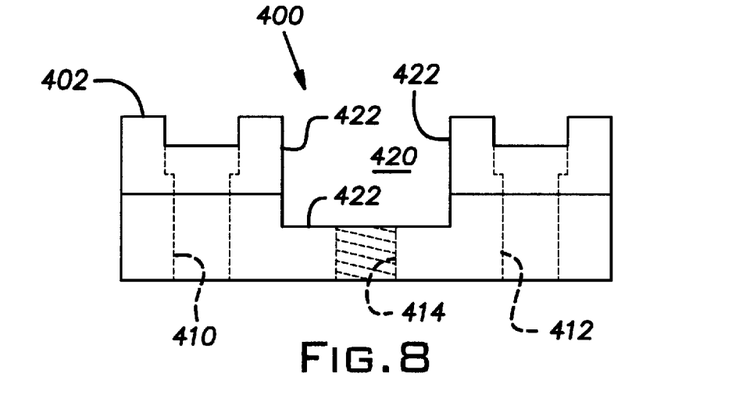
FIG. 8 is a schematic side view of a portion of an apparatus comprising a fourth embodiment of the invention.

An apparatus 400 comprising a fourth embodiment of the invention is shown in FIG. 8. The apparatus 400 includes a holding block 402 defining apertures 410, 412, 414. The apertures 410, 414 are equally spaced from the middle aperture 414, which is centered in the block 402 and further centered in a groove 420 defined by inner surfaces 422 of the block 402. The apertures 410, 412 are counter-sunk, smooth bore apertures that extend through the block 402.

During assembly, a pair of bolts respectively extend through the apertures 410, 412 and further through corresponding apertures in a wheel to corresponding nuts. The nuts and bolts fasten the block 402 to the wheel. Alternatively, the pair of bolts can be threadedly received in an opposing block on the opposite side of the wheel.

A threaded bolt is received in the aperture 414, and is threaded thereto. When a tooth is properly oriented and received in the groove 420, an aperture in the tooth aligns with the aperture 414. The bolt extends through the aperture in the tooth to thread into the aperture 414, and thereby to fasten the tooth to the block 402.

Figure 9:
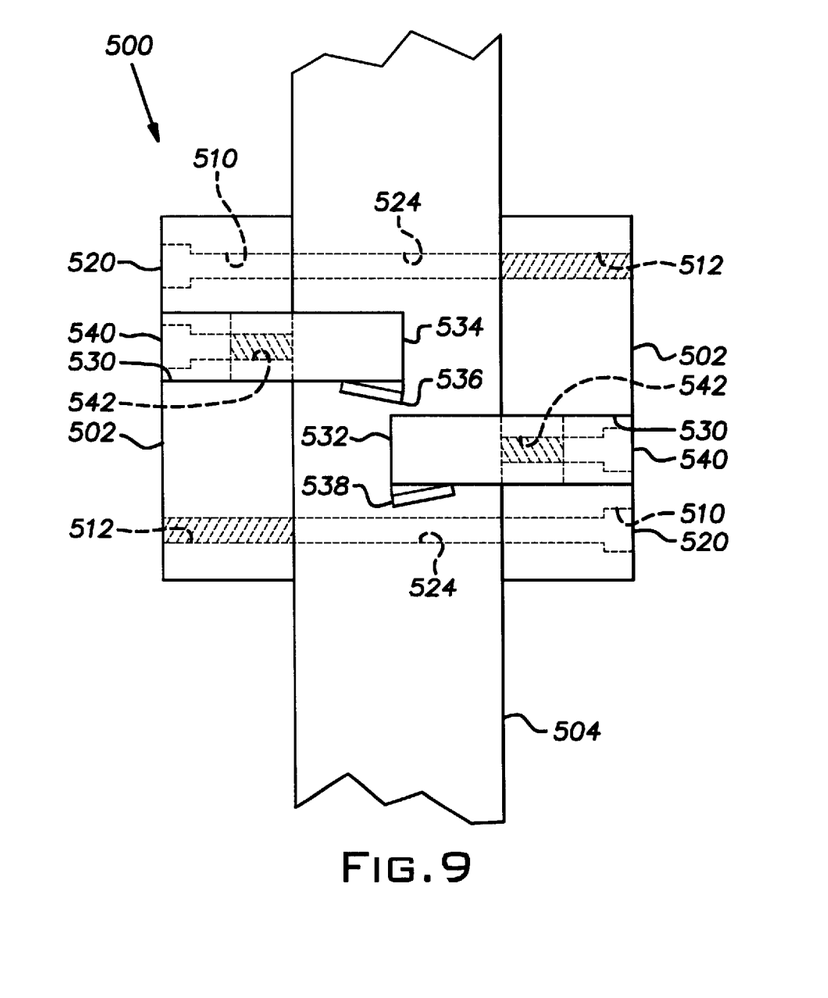
FIG. 9 is a schematic top view of a portion of an apparatus comprising a fifth embodiment of the invention.

An apparatus 500 comprising a fifth embodiment of the invention is shown in FIG. 9. The apparatus 500 includes a pair of holding blocks 502 mounted to opposite sides of a grinding wheel 504. Each block 502 defines a counter-sunk, smooth bore aperture 510 and a first threaded aperture 512. A bolt 520 extends from the smooth bore aperture 510 through a corresponding aperture 524 in the wheel 504 into the first threaded aperture 512 in the block 502 on the opposite side of the wheel 504. The blocks 502 are oriented relative to each other so that the smooth bore aperture 510 of one block 502 aligns with the threaded aperture of the opposite block 502.

Each block 502 defines a groove 530 that is offset from the center of the block 502 by about the width of the groove 530. Preferably, an outer side 531 of the block 502 has two portions that each define a 45 degree angle relative to a plane defined by an inner side 533 of the block 502.

A first and second cutting tooth 532, 534 are mirror opposites of each other. Each tooth 532, 534 has a cutting bit 536, 538 that is received in the groove 530 and oriented opposite of each other. Two bolts 540 are provided, each fastens a respective one of the first and second teeth 532, 534. Each of the bolts 540 threads into a threaded aperture 542 that is machined into the block 520 and that is centered in the groove 530.

During assembly, the block 502 and the corresponding opposite block 502 are fastened to each other through the wheel 504. The first tooth 532 is oriented in the groove 530 so as to extend beyond and around the wheel 504. The second tooth 534 is received into the groove 530 of the opposite block 502 and is oriented opposite of the first tooth 532 to also extend beyond and around the wheel 504.

Because the groove 530 of each block 502 is offset from the center of the block 502, the first and second teeth 532, 534 are likewise offset from each other. The cutting bits 536, 538 are angled relative to each other, such as by about 5 degrees, relative to a direction of rotation.

During operation, the wheel 504 rotates in the direction indicate by the directional arrow labeled DIRECTION. The cutting bits 536, 538 are contacted against a tree stump and the cutting bits 536, 538 cut a kerf into the tree stump with each succeeding rotation of the wheel 504.

The blocks 502 provide additional support to the teeth 532, 534. In particular, the extended middle portion of the block provides increased support, while the shoulders are spaced from the cutting bits 536, 538 to decrease the risk of impact against the blocks 502. However, if an impact should shear off one of the teeth 532, 534, a replacement tooth of the same orientation can be installed in its place.

Figure 10:
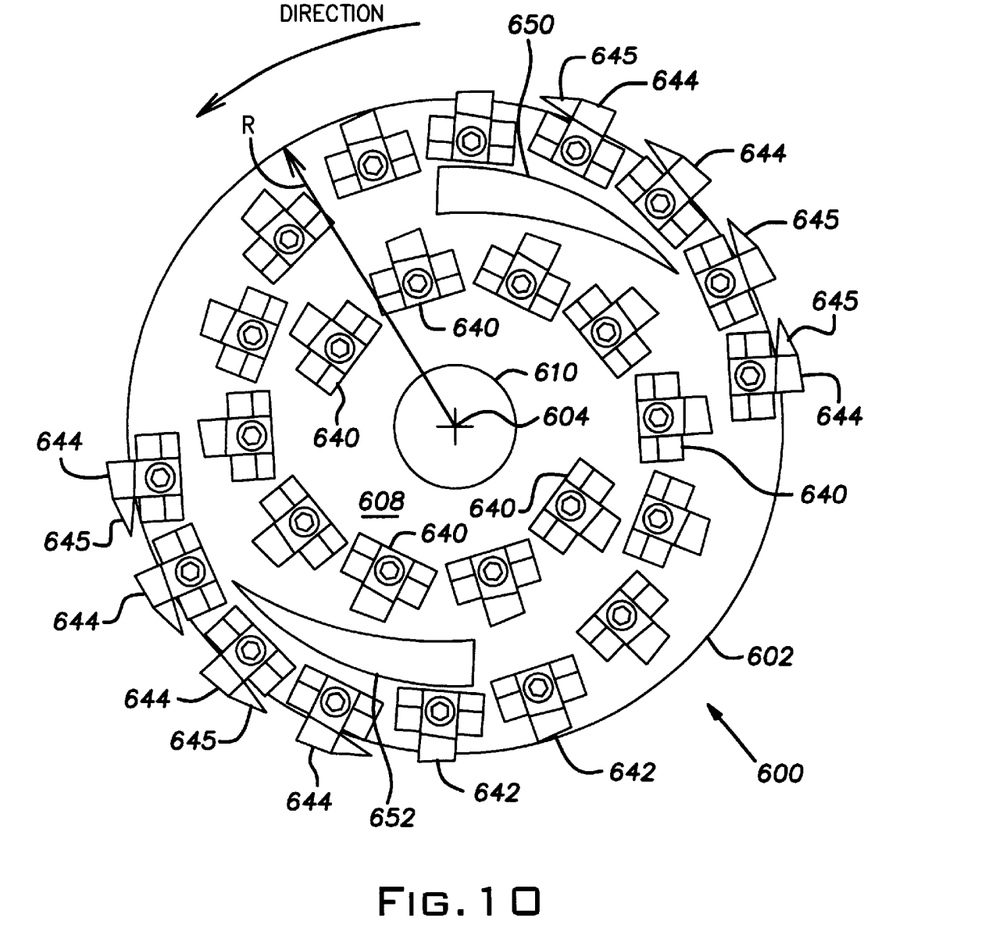
FIG. 10 is a schematic side view of an apparatus comprising a sixth embodiment of the invention.

An apparatus 600 comprising a sixth embodiment of the invention is shown in FIG. 10. The apparatus 600 includes a grinding wheel 602 that rotates about an axis 604. The wheel 602 rotates about the axis 604 in the direction indicated by the directional arrow labeled DIRECTION. The grinding wheel 602 has a line (R) extending perpendicular from the axis 604 along the radius of the wheel 602 to a peripheral edge 606. A surface 608 of the wheel 602 defines an aperture 610, which is centered on the axis 604.

A plurality of cutting assemblies mounts to the wheel 602 to form first and second spiral arrays. The arrays include interior, medial and peripheral cutting assemblies 640, 642, 644. The interior, medial cutting assemblies 640, 642 are like the cutting assembly 114 shown in FIG. 1, the peripheral cutting assembly 644 is like the cutting assembly 200 shown in FIG. 6, except rather than the cutting bits 262, the peripheral cutting assembly 644 has a spike shaped insert bit 645 to facilitate plunge cutting and digging, for example, rocky soil and asphalt. The interior and medial cutting assemblies 640, 642 differ from each other by the angle of their teeth in relation to a plane defined by the wheel surface 608. The closer the interior and medial cutting assemblies 640, 642 are to the axis 604, the larger the relative angle between the respective tooth and the plane defined by the wheel surface 608. In this embodiment, the interior cutting assembly 640 has a tooth that forms a 45 degree angle and the medial cutting assembly 642 has a tooth that forms a 35 degree angle.

In this embodiment, the interior and medial cutting assemblies 640, 642 each has a width (w), and a length (l) that is about three times the width (w). Any two of the interior and medial cutting assemblies 640, 642 are radially spaced from an adjacent one of the interior and medial cutting assemblies 640, 642 by a distance (d) in the range of about one half the width (w).

The apparatus 600 further includes a first and a second metal wear rail 650, 652. Each of the rails 650, 652 is oriented with relation to a respective one of the first and second spiral arrays. The wear rails 650, 652 are generally wedge shaped and are thickest near the peripheral edge 606 and taper to a thinnest point near the axis 604. The wear rails 650, 652 comprise, for example, USS "T-1" or USS Abrasion Resistant plate steel, commercially available from United States Steel Corporation (Pittsburgh, Pa.), and are welded to the wheel 602. Alternatively, other wear rails are bolted to the wheel 602 or both welded and bolted to the wheel 602.

To prevent corrosion, a protective coating, for example a wax coating, covers the entire apparatus 600. The coating can be periodically reapplied as necessary to maintain a desired level of corrosion protection.

During operation, the wheel 602 rotates on the axis 604 preferably at about 800 revolutions per minute (RPM). The apparatus 600 is brought in contact with, for example, a tree stump. The cutting assemblies cut and grind the tree stump. Wood chips, rock and debris from the cutting and grinding impact against the wear rails 650, 652 preferentially rather than against the wheel 602. Consequently, the wear rails 650, 652 protect the wheel surface 608 and the cutting assemblies from at least a portion of the abrading force caused by the impact from the wood chips, rock and debris. Further, the wear rails 650, 652 add mass to the wheel 602 to increase its rotational moment of inertia.

The cutting assemblies each cut and grind the stump in successive order. Because the arrays are preferably arranged in an overlapping spiral pattern there is at least one cutting assembly from each of the arrays cutting along the line (R). Therefore, two of the cutting assemblies are cutting along the line (R) rather than a single one if an array did not overlap with another array.

In an alternative embodiment, the holding blocks of peripheral cutting assemblies have tapering wedge-shapes on the exposed side of the block in the direction of a wheel rotation.

The embodiments described herein are examples of structures having elements corresponding to the elements of the invention recited in the claims. This written description may enable those skilled in the art to make and use embodiments having alternative elements that likewise correspond to the elements of the invention recited in the claims. The intended scope of the invention thus includes other structures that do not differ from the literal language of the claims, and further includes other structures with insubstantial differences from the literal language of the claims.

What is claimed is:

1. A stump-grinding apparatus comprising:
    a block having an inner surface and an outer surface, the inner surface being adjacent to a side of a wheel between a center and a peripheral edge of the wheel, and the outer surface defining a groove and a first aperture in the groove;
    a tooth configured to be received into the groove, the tooth having a first end, and a second end spaced from the first end and defining a second aperture configured to align with the first aperture; and
    a fastener extending through the first and second apertures, and thereby fastening the tooth to the block.

2. The apparatus as defined in claim 1 wherein the block is welded to the wheel.

3. The apparatus as defined in claim 2 wherein the inner side has a surface that defines locating cavities operable to orient the block with relation to the wheel.

4. The apparatus as defined in claim 1 wherein the block defines first and second additional apertures and the wheel defines corresponding wheel apertures for the first and second additional apertures.

5. The apparatus as defined in claim 4 wherein the first and second additional apertures are threaded apertures.

6. The apparatus as defined in claim 4 further comprising first and second bolts, wherein the bolts extend through the first and second additional apertures and extend further through the corresponding apertures in the wheel, so as to secure the block to the wheel.

7. The apparatus as defined in claim 1 wherein the block is machined from 4140 steel or medium carbon steel.

8. The apparatus as defined in claim 1 wherein the outer side has a surface that defines first and second planes that are both at an angle in a range of up to about 45 degrees relative to a plane defined by the inner side of the block.

9. The apparatus as defined in claim 8 wherein the tooth extends from the block at angle in a range of up to about 45 degrees.

10. The apparatus as defined in claim 1 wherein the outer side has a surface that defines first and second planes, the first plane is at an angle in a range of up to about 35 degrees and the second plane is at an angle in a range of up to about 55 degrees from a plane defined by the inner side.

11. The apparatus as defined in claim 10 wherein the tooth extends from the block at an angle in the range of up to about 55 degrees relative to a plane defined by the inner side of the block.

12. The apparatus as defined in claim 10 wherein the wheel has a peripheral edge and the tooth comprises a portion that extends over and around the peripheral edge, the tooth includes a first cutting tip oriented on the tooth so as to cut in a direction of rotation of the stump-grinding wheel.

13. The apparatus as defined in claim 12 further comprising a second tooth having a second cutting tip that is a mirror image of the tooth, the second tooth being fastened to the opposite side of the wheel as the tooth, and comprising a portion that extends over and around the peripheral edge such that the tooth and the second tooth are offset from each other, and the first and second cutting tips are oriented to cut in the same direction as each other.

14. The apparatus as defined in claim 1 wherein the tooth is fastened to the block with a single bolt.

15. The apparatus as defined in claim 14 further comprising two bolts operable to fasten the block to the wheel, and wherein the single bolt is smaller than the two bolts that hold the block to the wheel.

16. The apparatus as defined in claim 1 further comprising a wear rail secured to the wheel.

17. The apparatus as defined in claim 1 further comprising a protective coating covering the entire apparatus for protecting the apparatus from corrosion.

18. The apparatus as defined in claim 1 wherein the block has a tapered shoulder.

19. The apparatus as defined in claim 1 further comprising a cutting tip secured to the first end of the tooth.

20. The apparatus as defined in claim 19 wherein the cutting tip is a spike tip that is threadedly attached to the tooth.

21. The apparatus as defined in claim 19 wherein the cutting tip is at about a 5 degree angle relative to a direction of spin of the stump-grinding wheel.

22. The apparatus as defined in claim 1 wherein the fastener is a bolt having a bolt head, and the bolt head is recessed in an area defined by the tooth.

* * * * *

UNITED STATES PATENT AND TRADEMARK OFFICE
CERTIFICATE OF CORRECTION

PATENT NO. : 6,708,743 B2  Page 1 of 1
DATED : March 23, 2004
INVENTOR(S) : Robert P. Ziehm It is certified that error appears in the above-identified patent and that said Letters Patent is hereby corrected as shown below:

Column 10,
Line 12, insert -- 23. The apparatus as defined in claim 1 wherein the block is configured to have a wedge shaped leading edge. --

Signed and Sealed this

Twenty-fifth Day of May, 2004

JON W. DUDAS
*Acting Director of the United States Patent and Trademark Office*